United States Patent
Walker et al.

(10) Patent No.: US 6,988,077 B1
(45) Date of Patent: *Jan. 17, 2006

(54) SYSTEM AND METHOD FOR OFFERING MULTIPLE PRODUCTS

(75) Inventors: Jay S. Walker, Ridgefield, CT (US); Andrew S. Van Luchene, Norwalk, CT (US); Deirdre O'Shea, New York, NY (US)

(73) Assignee: Walker Digital, LLC, Stamford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/283,389

(22) Filed: Apr. 1, 1999

Related U.S. Application Data

(63) Continuation-in-part of application No. 09/260,439, filed on Mar. 2, 1999, now Pat. No. 6,658,390.

(51) Int. Cl.
*G06F 17/60* (2006.01)
(52) U.S. Cl. .................................................. 705/14
(58) Field of Classification Search .................. 705/1, 705/14, 26, 35, 27, 37, 39; 709/200, 202, 709/203, 227; 395/237, 235, 214
See application file for complete search history.

(56) References Cited

U.S. PATENT DOCUMENTS

| | | | |
|---|---|---|---|
| 4,799,156 A | 1/1989 | Shavit et al. | |
| 4,908,761 A | 3/1990 | Tai | |
| 5,253,165 A | 10/1993 | Leiseca et al. | 364/407 |
| 5,270,921 A | 12/1993 | Hornick | 364/407 |
| 5,283,731 A | 2/1994 | Lalonde et al. | |
| 5,495,412 A | 2/1996 | Thiessen | |
| 5,644,721 A | 7/1997 | Chung et al. | 395/206 |
| 5,687,322 A | 11/1997 | Deaton et al. | |
| 5,689,652 A | 11/1997 | Lupien et al. | |
| 5,724,521 A | 3/1998 | Dedrick | |
| 5,794,219 A | 8/1998 | Brown | |
| 5,797,127 A | 8/1998 | Walker et al. | 705/5 |

(Continued)

FOREIGN PATENT DOCUMENTS

| WO | WO 96/34356 | 10/1996 |
|---|---|---|

(Continued)

OTHER PUBLICATIONS

Scroggins, Deborah, "Antiques: Treasures Among the Junk", Atlanta Constitution, May 15, 1989, 2 pp.*

(Continued)

*Primary Examiner*—James W. Myhre
(74) *Attorney, Agent, or Firm*—Michael D. Downs; Magdalena M. Fincham

(57) ABSTRACT

A system and method for a supplier to offer multiple new products to a first person and multiple pre-owned products to a second person are disclosed. The invention includes a method wherein the supplier receives a request from the first person for a first new product. After accepting the first new product, the supplier stores data identifying the first person and data relating to the first new product in a memory of a computer. Thereafter, the second person queries the supplier about a pre-owned product. The supplier searches the memory of the computer to determine whether the data relating to the first new product satisfies the second person's inquiry for the pre-owned product. If so, the supplier transmits an offer for a second new product to the first person based on the data identifying the first person. If the offer is acceptable to the first person, the supplier provides the second new product to the first person and the pre-owned product to the second person.

112 Claims, 13 Drawing Sheets

U.S. PATENT DOCUMENTS

| | | | |
|---|---|---|---|
| 5,832,451 A | 11/1998 | Flake et al. | 705/5 |
| 5,842,176 A | 11/1998 | Hunt et al. | 705/5 |
| 5,845,265 A * | 12/1998 | Woolston | 705/37 |
| 5,864,818 A | 1/1999 | Feldman | 705/5 |
| 5,913,210 A | 6/1999 | Call | 707/4 |
| 6,058,379 A | 5/2000 | Odom et al. | 705/37 |
| 6,067,532 A | 5/2000 | Gebb | 705/37 |
| 6,085,169 A | 7/2000 | Walker et al. | 705/26 |
| 6,107,932 A | 8/2000 | Walker et al. | 340/825.31 |
| 6,598,026 B1 | 7/2003 | Ojha et al. | 705/26 |
| 6,658,390 B1 * | 12/2003 | Walker et al. | 705/5 |

FOREIGN PATENT DOCUMENTS

| | | | |
|---|---|---|---|
| WO | WO 97/23838 | * | 4/1997 |
| WO | WO 97/23838 | | 7/1997 |
| WO | WO 99/60489 | | 11/1999 |

OTHER PUBLICATIONS

Flaxer, Mark, "Southern Electronics Corporation Signs a Distribution Agreement with Number Nine Visual Technologies", Business Wire, Mar. 6, 1996, 1 pp.*

Kater, Cynthia, "Visiontek: Visiontek Launches New PC Cards with the Industry's First Same Day Roadside Assistance Program for Mobile Computer Users", Business Wire, Mar. 12, 1996, 2 pp.*

Shimbun, Yomiuri, "Gateway Launches Purchase Program", Asia Intelligence Wire, Oct. 28, 1998, 1 pp.*

"Carriers Move to Counter Skytrain", Aviation Week and Space Technology, Aug. 8, 1977, Section: Air Transport, p. 27.

Connolly, M. J. et al., Definition: "Right of Redemption", Black's Law Dictionary, West Publishing, Co., 1990.

"Deed of Trust", Fannie Mae/Freddie Mac Uniform Instrument for Virginia, Single Family Form 3047, Amended May 1991.

"Virgin Atlantic Changes Standby to Same-Day Fare", Aviation Daily, May 18, 1992, Section: vol. 308, No. 34, p. 293.

"Lufthansa Chief Plots Turnaround Strategy", Aviation Week and Space Technology, Mar. 8, 1993, Section: On the Record, vol. 138, No. 10, p. 40.

Website: "Fly-Rights—A Consumer Guide to Air Travel", (http www dot gov/airconsumer/flyrights htm), Tenth revised edition, Sep. 1994.

Feldman, Joan M., "Getting serious on pricing; airlines", Air Transport World, Oct. 1994, Section: vol. 31, No. 10, p. 56, ISSN: 0002-2543.

"Merriam-Webster's Collegiate Dictionary", Tenth Edition, 1996, p. 1173.

"Merriam-Webster's Collegiate Dictionary", Tenth Edition, 1996, pp. 974 and 1323.

Snow, Mathew C., "New reservation system takes flight at Air France; Company Operations", Datamation, Apr. 1997, Section: No. 4, vol. 43, p. 18, ISSN: 0011-6963.

Fairbank, Katie, "There's little room in the air this summer as carriers fill up planes", The Associated Press, Jul. 14, 1997, Section: Business News.

Feldman, Joan M., "Pricing and cybersales; Internet airline ticket sales and reservations" Air Transport World, Feb. 1998, Section: No. 2, vol. 35, p. 64, ISSN: 0002-2543.

Desiraju, Ramarao and Shugan, Steven M., "Strategic Service Pricing and Yield Management", Journal of Marketing, Jan. 1999, vol. 63, pp. 44-56.

U.S. Provisional Patent Application Serial No. 60/117,118, filed Jan. 25, 1999, entitled "Methods and Apparatus for Brokering Transactions", in the name of Pernendu Ojha.

"The Authoritative Dictionary of IEEE Standards Terms", Seventh Edition, Copyright 2000, p. 725.

* cited by examiner

| | INITIAL PURCHASER IDENTIFIER 3C1 | INITIAL PURCHASER NAME 3C2 | ADDRESS 3C3 | TELEPHONE NUMBER 3C4 | E-MAIL ADDRESS 3C5 | PREFFERED CONTACT 3C6 | AGREEMENT TERM CODES 3C7 | DATE OF PURCHASE 3C8 |
|---|---|---|---|---|---|---|---|---|
| 3R1 → | C1I | D. JOHNSON | 432 MIAMI BLVD. VICE, FL 62334 | (617) 234-4321 | DJ@ MVICE.COM | REGULAR MAIL | A,J | 06/15/98 |
| 3R2 → | C2I | B. WILLIS | 2 MOONLIGHT PL. BRUNO, FL 62345 | (617) 227-4321 | BW137@ BELL.SO.COM | E-MAIL | D,L | 05/12/97 |
| 3R3 → | C3I | C. SHEPPARD | 16 MADDIE RD. FLATS, FL 62346 | (617) 167-6234 | CSHEP@ C.SIDE.ORG | TELEPHONE | E | 12/22/98 |
| 3R4 → | C4I | T. SELECK | 14 FARRI RD. PRINT, FL 62347 | (617) 614-4147 | TOM@ CNB.NET | E-MAIL | C,K | 07/06/98 |

| INITIAL PURCHASER IDENTIFIER 4C1 | MAKE 4C2 | MODEL 4C3 | YEAR 4C4 | 4C5 {COLOR | AC | STEREO W/ CASSETTE | STEREO W/ 6 DISC CD | SUN ROOF} | APPROX. AVAILABILITY 4C6 |
|---|---|---|---|---|---|---|---|---|---|
| C1I | SAAB | 9-5 | 1998 | EVIL BLUE | X | – | X | – | 06/15/98 |
| C2I | SAAB | 9-3 SE | 1997 | ANGORA | – | X | – | X | 11/12/98 |
| C3I | SAAB | 9-3 | 1998 | GARNET | X | X | – | X | 12/22/00 |
| C4I | SAAB | 9-5 WAGON | 1998 | PUMPKIN | X | X | X | – | 07/06/99 |

FIG. 4

| AGREEMENT TERM CODES 5C1 | AGREEMENT TERM TIME PERIOD 5C2 |
|---|---|
| A | ANY TIME |
| B | AFTER 1/2 YEAR |
| C | AFTER 1 YEAR |
| D | AFTER 1 1/2 YEARS |
| E | AFTER 2 YEARS |
| F | AFTER 2 1/2 YEARS |

| PRODUCT INFORMATION | |
|---|---|
| J | NEW YEAR OF SAME MAKE AND SAME MODEL |
| K | NEW YEAR OF SAME MAKE AND DIFFERENT MODEL |
| L | NEW YEAR OF DIFFERENT MAKE AND DIFFERENT MODEL |

FIG. 5

| IN STOCK 6C1 | MAKE 6C2 | MODEL 6C3 | YEAR 6C4 | COLOR | AC | STEREO W/ CASSETTE | STEREO W/ 6 DISC CD | SUN ROOF |
|---|---|---|---|---|---|---|---|---|
| 1 | SAAB | 9-3 SE | 1999 | ANGORA | X | X | – | – |
| 2 | SAAB | 9-3 SE | 1999 | ANGORA | X | X | – | – |
| 1 | SAAB | 9-3 SE | 1999 | ANGORA | X | – | X | X |
| 1 | SAAB | 9-3 SE | 1999 | PUMPKIN | X | – | X | X |
| 2 | SAAB | 9-3 SE | 1999 | EVIL BLUE | X | – | X | X |

FIG. 6

| SUBSEQUENT PURCHASER IDENTIFIER 7C1 | SUBSEQUENT PURCHASER NAME 7C2 | ADDRESS 7C3 | TELEPHONE NUMBER 7C4 | E-MAIL ADDRESS 7C5 | PREFERRED CONTACT 7C6 |
|---|---|---|---|---|---|
| C1S | J. TRIPPER | 234 SYNDICATION ST. JANET, FL 62344 | (617) 867-5309 | JTRIP@ HOTMALE.COM | REGULAR MAIL |
| C2S | W. FURLEY | 3 COMPANY RD. LANDING, FL 62345 | (617) 432-3412 | N/A | TELEPHONE |
| C3S | L. SHIRLEY | 16 SQUIGGY ST. BREWERY, FL 62346 | (617) 567-7654 | LAS@ C.SIDE.ORG | TELEPHONE |
| C4S | A. FONZARELLI | 22 MILWAKEE PL. CUNNINGHAM, FL 62347 | (617)998-2246 | FONZ@ RETRONET.NET | E-MAIL |

| PURCHASER IDENTIFIER | MAKE | MODEL | YEAR | ACCESSORIES ||||| 
| | | | | COLOR | AC | STEREO W/ CASSETTE | STEREO W/ 6 DISC CD | SUN ROOF |
| 8C1 | 8C2 | 8C3 | 8C4 | | | | | |
| C1S | SAAB | 9-5 | 1998 | EVIL BLUE | X | — | X | — |
| C2S | SAAB | 9-3 SE | 1997 | BLUE | — | X | — | X |
| C3S | SAAB | 9-3 | 1998 | GARNET | X | X | — | X |
| C44 | SAAB | 9-3 | 1998 | GARNET | X | X | X | — |

FIG. 8

SYSTEM AND METHOD FOR OFFERING MULTIPLE PRODUCTS

The present application is a continuation-in-part of U.S. application Ser. No. 09/260,439, now U.S. Pat. No. 6,658,390, entitled "System and Method for Reselling a Previously Sold Product," filed on Mar. 2, 1999.

FIELD OF THE INVENTION

The present invention relates generally to a system and method for facilitating the transfer and tracking of a multiple number of products received by customers, and more particularly, to a system and method for a supplier to offer multiple new products to initial purchasers and multiple pre-owned products to subsequent purchasers.

BACKGROUND OF THE INVENTION

There are numerous inefficiencies that hinder the sale of new and used products today. The inefficiencies affect various marketplace participants such as consumers of new products, consumers of pre-owned products, and product suppliers. The affects include: (i) reducing the ability of consumers of new products from readily disposing of previously purchased products so that they may obtain the newest products available on the market; (ii) impeding consumers of pre-owned products from having access to the widest selection and highest quality pre-owned products on the market; and (iii) impeding product suppliers from maximizing their resources.

With respect to consumers of new products, a number of these consumers prefer to own products that incorporate the latest technology or the latest fashion. However, because manufacturers are continually introducing new products to the market that incorporate ever improved technology or fashion, products that are relatively new often become "outdated" within a few years or even a few months.

In addition, other consumers of new products will purchase products that fulfill their immediate needs, but become inadequate to serve those needs after a relatively short period of time. As an example, consider a consumer who utilizes specialized software in their business. After a period of time, the manufacturer of the software will release new revisions of the software that incorporate important changes in functionality. For the software to operate properly, however, the software requires a computer with more memory or computing power. In order to remain competitive, the consumer is forced to purchase the new revision of the software and, consequently, must upgrade to a new computer system. Upgrading the computer system of even a small business can necessitate the spending of many thousands of dollars to purchase several personal computers, network hardware, and computer servers.

Furthermore, consumers will often purchase new products that become unnecessary to them because of a change in their circumstances. For example, a consumer may initially purchase a riding lawn mower for maintaining the lawn of a particular property. Thereafter, the consumer may move to a residence having a smaller lawn or no lawn at all. In such a situation, the consumer may decide to sell the riding lawn mower. In this situation, the sale of the product is typically difficult to accomplish, and often results in the receipt of an unsatisfactory price for the product.

To obviate the above-described problems confronting consumers of new products, such consumers may obtain new products through, for example, lease agreements. Lease agreements provide consumers the advantage of being able to return the product to the lessor after a predetermined amount of time. A disadvantage of lease agreements, however, is that they provide little flexibility to consumers. For example, the time period in which a consumer can ultimately purchase the product and the amount to be paid therefor are typically fixed. In addition, the consumer typically gains no equity in the product and, therefore, receives no "credit" for the product when it is returned to the lessor.

An alternate way in which consumers of new products attempt to obviate the above-described problems is by finding purchasers for their pre-owned products so they can sell the unwanted products themselves. Thereafter, if consumers so choose, they can purchase a replacement product. A disadvantage of this alternative is that it is difficult to find purchasers that are willing and able to purchase pre-owned products. Yet another alternative is for consumers of new products to forego purchasing new products altogether and deal with their need in another way. Consumers can pay a service to perform the tasks that the new products would have performed. For example, a consumer may decide not to upgrade to a higher quality washer/drier because the initial cost is high. Instead he may opt to take clothing to a professional dry cleaner/launderer. Even though the professional service is more expensive in the long run, the consumer saves himself from the large initial cost.

Consumers of pre-owned products often prefer to purchase pre-owned products because they either lack the need for the latest technology, they are thrifty, or they are unable to afford the higher costs associated with purchasing new products. As noted above, consumers of pre-owned products do not readily gain access to the widest selection and highest quality products on the market. Therefore, they do not get the best deals that would otherwise be available to them if they had such access. In addition, because of the present inefficiencies in transferring pre-owned products from their original owners to the consumers of pre-owned products, any warranty coverage that may be associated with a pre-owned product is significantly reduced or even lost altogether.

Regarding retailers, although they are probably in the best position to penetrate the market for which they have products, they often fall short in maximizing the potential of this position. This is due in large part to their inefficient use of valuable information concerning their customers in their daily business operations.

In an attempt to remedy some of the problems described above, Gateway 2000 (N. Sioux City, S. Dak.) has started a program entitled Your:)Ware$^{sm}$. This program allows a consumer to purchase a new Gateway computer today and, after between two and four years, trade in the computer for credit toward another new Gateway computer. To qualify for the program, a customer must either commit to six months of Gateway's Internet service, add one or more extra software bundles, or finance the purchase through Gateway's financing plan. This approach is lacking in that it provides only a single two-year period in which a customer can purchase a new computer and trade in the old one. In addition, customers can buy and trade in only Gateway computers.

Another system which may remedy some of the problems described above is found in U.S. Pat. No. 5,845,265 to Woolston ("'265 patent"). The '265 patent discloses a method and apparatus for creating a computerized market for pre-owned and collectible goods. The method and apparatus includes a plurality of posting terminals networked with a consignment node. The consignment node includes a database of pre-owned goods. The system purports to allow the purchaser to purchase a pre-owned good, change the price of the good, and resell the good through the consignment node. The '265 patent, however, does not provide an efficient system wherein consumers may readily dispose of previously purchased products so that they may obtain the newest products available on the market.

An auction service that allows consumers to bid against consumers is the Internet site eBay™ operated by eBay, Inc. (San Jose, Calif.). The auctions in eBay™ last from three (3) to seven (7) days. Participants must register with eBay Inc. Just as traditional auctions operate, the auctioned item goes to the highest bidder. The highest bidder and the seller contact each other directly after the auction is over to finalize the purchase. The system provided by eBay's™ is lacking because it also fails to provide an efficient system wherein consumers may readily dispose of previously purchased products so that they may obtain the newest products available on the market. In addition, because the consumers must contact each other to finalize the sale, eBay™ does not maintain control of the immediate transaction or any future transactions that evolve therefrom.

The above described attempts fall short of eliminating the numerous inefficiencies in the marketplace that must be confronted by consumers of new products, consumers of pre-owned products, and suppliers of products. Thus, there is a need for a system and method that will solve the shortcomings of the prior art described above.

SUMMARY OF THE INVENTION

One aspect of the present invention is directed to a system for a supplier to offer multiple products to a first person. The system includes a memory for storing data relating to a first product that has been provided to the first person and data identifying the first person. The system also includes a processor that is in communication with the memory. The processor is programmed to store the data relating to the first product and the data identifying the first person in the memory; receive an inquiry relating to the first product from a second person; search the memory to determine whether the data relating to the first product is stored therein; and transmit an offer for a second product to the first person based on the data identifying the first person.

The processor may be further programmed to receive data relating to an agreement between the supplier and the first purchaser, the agreement relating to the providing of the first product to the first person, wherein the agreement is selected from at least one of a lease agreement, a finance purchase agreement, and an outright purchase agreement.

The processor may also be programmed to receive data relating to an agreement between the supplier and the first purchaser, which provides that the supplier is to offer the first person the second product. The agreement may provide a time period within which the supplier will transmit the offer for the second product to the first person. In addition, the agreement may provide a description of the second product that the supplier will offer. Furthermore, the agreement may provide that the first person will obtain the second product for an amount equal to a cost of the second product minus a fair market value of the first product, wherein the fair market value of the first product is determined by a third party.

The data that relates to the first product may specify a manufacturer, physical characteristics, model, and product identifier of the first product. And the data identifying the first person may be selected from at least one of a name, address, telephone number, e-mail address, and/or product identifier of the first person.

The processor may be further programmed to evaluate the availability of the first product. The availability of the first product may be affected by: (i) an agreement between the supplier and the first person that describes a time period within which the first person may be contacted in order to receive the offer; (ii) the availability, e.g., is the product ready to be delivered, of the second product; and/or (iii) the cost of the second product.

Further features of the system and method of the subject invention will become more readily apparent from the following detailed description taken in conjunction with the drawings.

BRIEF DESCRIPTION OF THE DRAWINGS

So that those of ordinary skill in the art to which the subject invention pertains will more readily understand how to make and use the system and method described herein, preferred embodiments of the invention will be described in detail with reference to the drawings, wherein:

FIG. 3 is a sample table of data from an initial purchaser file arranged in accordance with an embodiment of the present invention;

FIG. 4 is a sample table of data from a pre-owned products file arranged in accordance with an embodiment of the present invention;

FIG. 5 is a sample table of data from an agreement terms file arranged in accordance with an embodiment of the present invention;

FIG. 6 is a sample table of data from a new product file arranged in accordance with an embodiment of the present invention;

FIG. 7 is a sample table of data from a subsequent purchaser file arranged in accordance with an embodiment of the present invention;

FIG. 8 is a sample table of data from a sought-after product file arranged in accordance with an embodiment of the present invention;

DETAILED DESCRIPTION OF THE PREFERRED EMBODIMENTS

Reference is now made to the accompanying Figures for the purpose of describing, in detail, the preferred embodiments of the present invention. The Figures and accompanying detailed description are provided as examples of the invention and are not intended to limit the scope of the claims appended hereto.

The present invention provides a novel and unique system and method for a supplier to provide a multiple number of new products to a first person. The present invention also provides a system and method for the supplier to provide a market for products that are in the first person's possession when he is interested in getting rid of them. Further, the present invention provides a convenient and efficient system and method for a second person to inquire about, and ultimately purchase, products owned by the first person.

For the description that follows, the term "supplier" shall refer to a party who provides a product to a purchaser. The supplier may be, for example, a retailer, wholesaler, or manufacturer of goods or provider of services. Also, the term "initial purchaser" shall refer a party who obtains a new product from a supplier. In addition, the term "pre-owned product" shall refer to a product that is in the possession of the initial purchaser for a period of time. Further, the term "subsequent purchaser" shall refer to a party who obtains a pre-owned product. It should be noted that although product transfers from the supplier to the initial purchaser and from the supplier to the subsequent purchaser may include various types of agreements, for example, lease agreements and finance purchase agreements, product transfers will be described below as sales and purchases. Doing so simplifies the description of the preferred embodiments of the present invention.

In addition, the term "fair market value" shall refer generally to the price at which a product would sell for in an open market. Examples of terms synonymous with fair market value include actual cash value, actual value, cash market value, fair cash value, and reasonable market value. Still further, the "cost" of a product shall refer to the price a purchaser may pay for the product to acquire it, whether paying by, for example, cash or credit.

Figure 1:
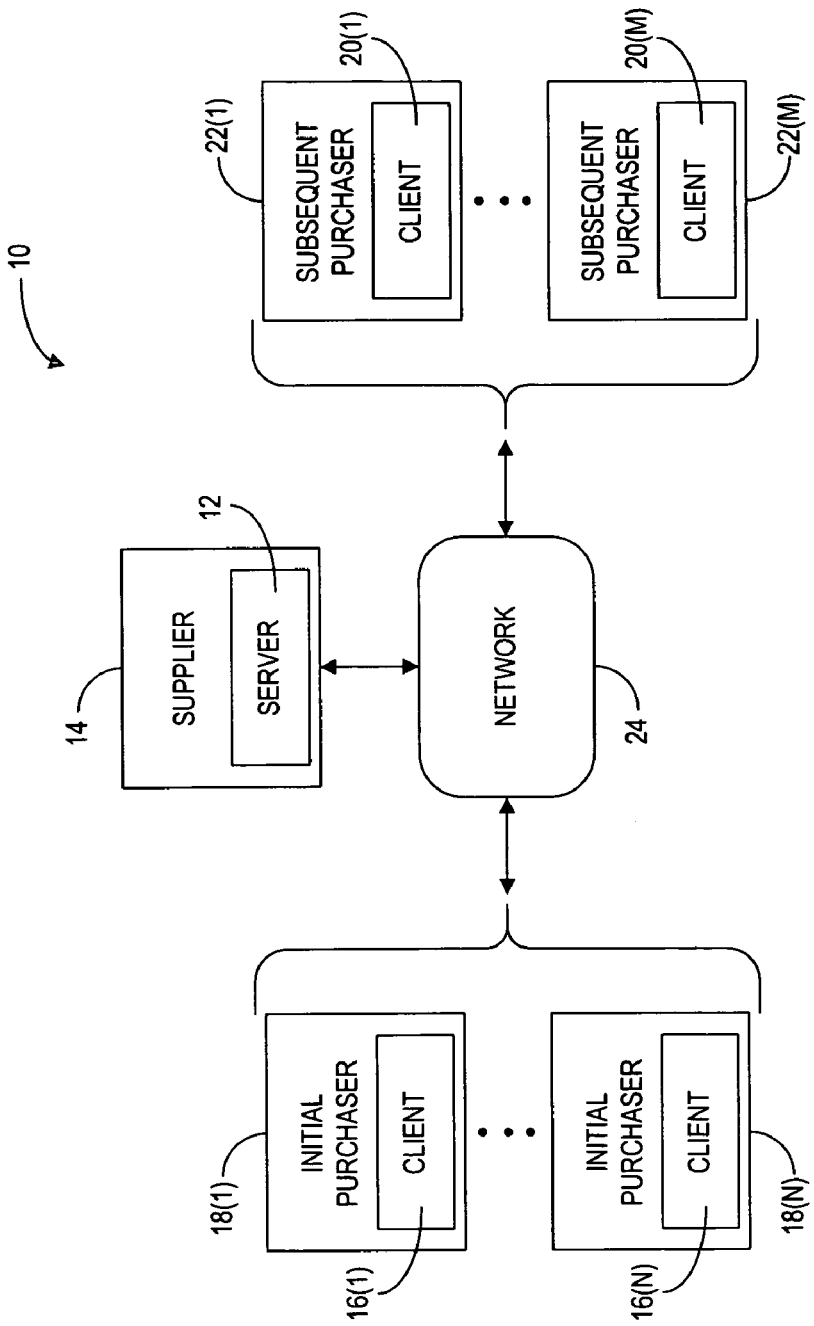
FIG. 1 is a block diagram of a network enabling a supplier to offer a multiple of products to purchasers.

Referring now to the drawings wherein like reference numerals identify similar elements of the present invention, there is illustrated in FIG. 1 a block diagram depicting a computer network system 10 for enabling a supplier to provide multiple products to purchasers. System 10 includes a server 12, which is operated by a supplier 14 of certain types of products. The server 12 is a general-purpose network server who includes application programs and databases to support various transactions between the supplier 14 and the supplier's customers. The supplier may be a vendor of any number or type of consumer products, for example, computers, software, cars, books, camping equipment, etc. In addition, the supplier can be a supplier of various services, for example, equipment maintenance, security, cleaning services, etc.

Linked to the server 12, via network 24, are one or more clients 16 operated by initial purchasers 18 and one or more clients 20 operated by subsequent purchasers 22. For example, server 12 is linked, via network 24, to client 16(1) which is operated by initial purchaser 18(1) and to client 20(1) which is operated by subsequent purchaser 22(1). Clients 16 and clients 20 may comprise a conventional personal computer, such as those based on the Intel® Pentium® microprocessor, or a Palm VII® wireless hand-held organizer by Palm Computing®. Clients 16 and 20 may be linked to the server 12 through any conventional networking 24 means. Those skilled in the art recognize that various embodiments of a network 24 means include, but are not limited to, a connection to the Internet via modems and Internet host, a direct Internet connection via routers, hard-wired point-to-point connections, radio communications, optical communications, and combinations of the aforementioned.

An embodiment of the present invention includes initial purchaser 18(1) purchasing a first product from the supplier 14 and registering the purchase with the supplier 14. As part of the purchase, initial purchaser 18(1) agrees to accept offers for a second new product in exchange for turning in the first new product. Alternately, the initial purchaser 18 may agree to turn in the first new product after an agreed upon or predetermined period of time.

The information pertaining to this transaction is entered into a database in a memory (not shown) of the server 12.

The embodiment further includes the subsequent purchaser 22(1) making an offer to or querying the database of the server 12 to determine if a pre-owned product, for example, the first product owned by the initial purchaser, matches a product he desires/needs. If a match is found between the desired/needed pre-owned product and, for example, the first product owned by the initial purchaser, and the predetermined period of time has passed, the supplier 14 may offer the initial purchaser 18(1) the second product. If the initial purchaser 18(1) accepts the offer, the initial purchaser 18(1) provides the pre-owned product to the supplier 14 and purchases the second product for, for example, the price of the second product minus the current fair market value of the pre-owned product. The subsequent purchaser 22(1) then purchases the pre-owned product from the supplier 14. The subsequent purchaser 22 may register the purchase of the first product with the supplier, as the initial purchaser 18 did. Further details of the above-described method and apparatus are provided below.

Figure 2:
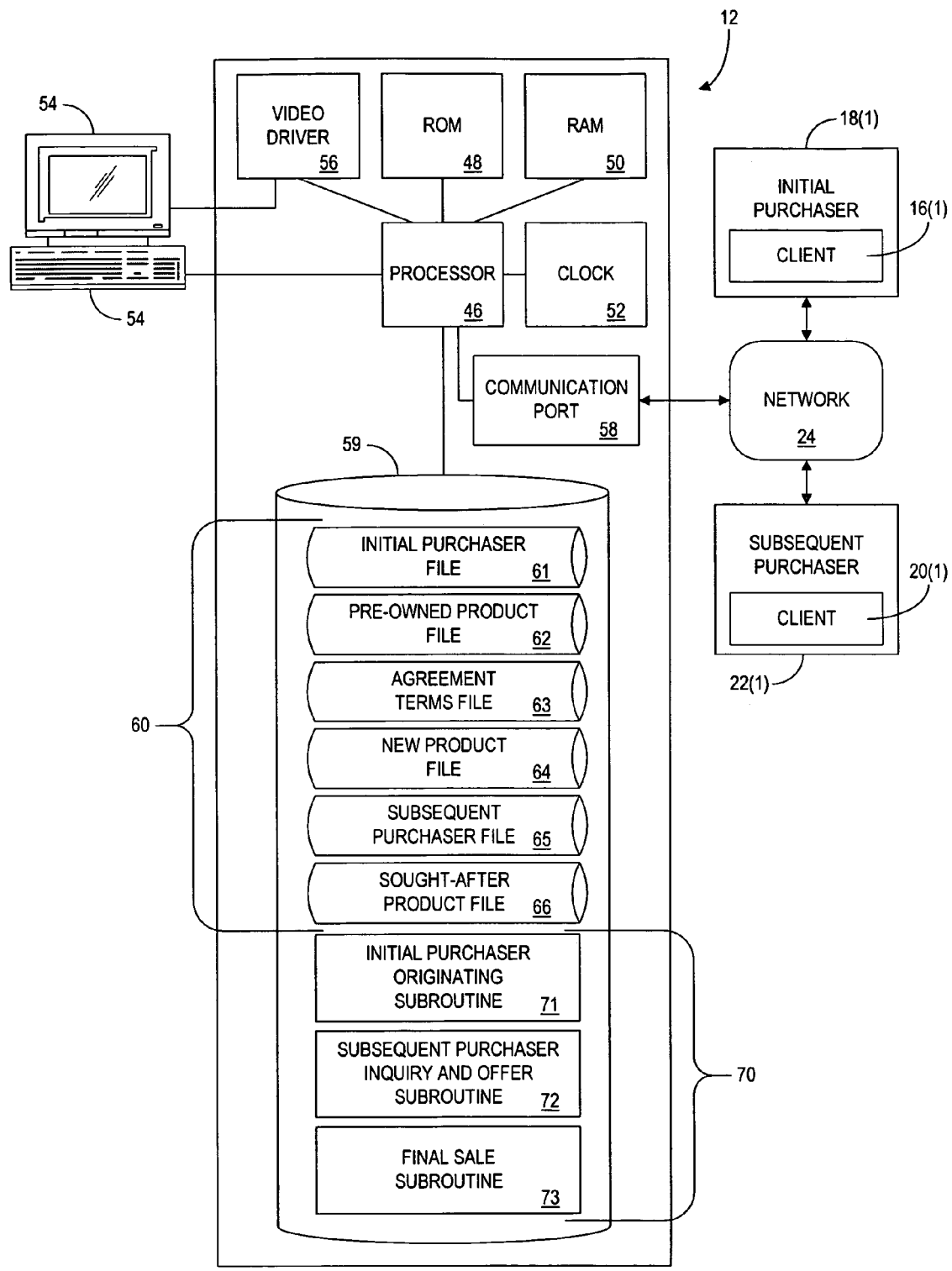
FIG. 2 is a block diagram of a server.

Referring now to FIG. 2, server 12 is shown in communication with client 16(1) operated by initial purchaser 18(1) and client 20(1) operated by subsequent purchaser 22(1) through network 24. The server 12 includes a processor unit 46, which executes application programs of the present invention. Processor 46 may comprise one or more conventional microprocessors, such as the Intel® Pentium II® microprocessor. Server 12 also includes a read only memory 48 (ROM) and a random access memory 50 (RAM), collectively referred to herein as memory. The ROM 48 may be used to store at least some of the program instructions of the application programs that are to be executed by the processor 46, such as portions of the operating system. The RAM 50 is used for temporary storage of data. A clock circuit 52 provides a clock signal, which may be required for proper operation of the processor 46.

A video monitor 54 is in communication with the processor 46 via a video driver 56 for conveying information to, for example, a server operator. While the video monitor 54 is typically a cathode ray tube (CRT), other types of video display devices, including liquid crystal displays, light emitting diodes, and thin film transistor panels, may be used as well. An input device 57 is in communication with the processor 46 to enable the server operator to enter data into the server 12. Any of a wide variety of input devices would be suitable for this purpose, including, for example, keyboards, mice, and touch screens. The server 12 further includes a communication port 58 which enables the processor 46 to communicate with devices external to the server 12 (e.g. client 16(1) and client 20(1)) through the network 24.

The processor 46 stores information to, and reads information from, a storage device 59. The storage device 59 has database files 60 stored thereon including an initial purchaser file 61, pre-owned product file 62, agreement terms file 63, new product file 64, subsequent purchaser file 65, and a sought-after product file 66. In addition, the storage device 59 includes application programs 70 stored thereon including an initial purchaser originating subroutine 71, subsequent purchaser inquiry and offer subroutine 72, and the final sale subroutine 73. The application programs 70 retrieve data from the database files 60 as necessary to perform the transactions described herein. While FIG. 2 depicts database files 60 and application programs 70 of particular types, those skilled in the art will recognize that various other types of files and application programs may be created that conform to the present invention.

FIGS. 3 through 8 illustrate sample tables for organizing the data stored in the database files 60 (FIG. 2). The database files 61, 62, 63, 64, 65 and 66 are described in detail below and depicted with exemplary entries in the accompanying figures. As will be understood by those skilled in the art, the schematic illustrations and accompanying descriptions of the database files presented herein are exemplary arrangements for stored representations of information. A number of other arrangements may be employed besides those suggested by the tables shown. Similarly, the illustrated entries of the database files represent exemplary information, and those skilled in the art will understand that the number and content of the entries can be different from those illustrated herein.

Referring to FIG. 3, a sample initial purchaser table 80 is illustrated, which includes sample data from the initial purchaser file 61 stored in storage device 59 (FIG. 2). Table 80 includes information about initial purchasers 18 collected at the time each initial purchaser 18 registered a sale with the supplier 14. This would typically occur when an initial purchaser 18 purchases a new product from the supplier 14; however, an initial purchaser 18 may purchase a new product from a third party and, thereafter, register the sale with the supplier 14.

The initial purchaser table 80 includes records (3R1 through 3R4) for each initial purchaser 18. A purchaser identifier field (field 3C1) is included in table 80.

The purchaser identifier 3C1 uniquely identifies an initial purchaser 18. Each record 3R1 through 3R4 further includes a field for the name of each initial purchaser (field 3C2), and fields for each initial purchaser's address (field 3C3), telephone number (field 3C4), e-mail address (field 3C5), preferred method for being contacted (field 3C6), agreement term codes (field 3C7), and the date of purchase of the new product (field 3C8). As will be become more apparent below, identifying each initial purchaser 18 by a unique identifier facilitates anonymity between initial purchasers 18 and subsequent purchasers 22.

Referring to FIG. 4, a sample pre-owned product table 82 is illustrated, which includes sample data from the pre-owned product file 62 stored in storage device 59 (FIG. 2). Table 82 includes information about the products that were purchased and are presently in the possession of the initial purchasers 18 listed in table 80.

Each record 4R1 through 4R4 includes a field for the purchaser identifier (field 4C1) that uniquely identifies the initial purchaser of the product identified in each record of the pre-owned product table 82. The initial purchaser identifiers of the table 82 correspond to the initial purchaser identifiers of the table 80. The pre-owned product table 82 further includes a field for the make (field 4C2), model (field 4C3), year (field 4C4), and various attributes (field 4C5) of each product. Also, a field is included (4C6) indicating the approximate date that a product is likely to be available for purchase. Using purchaser identifiers enables the supplier 14 to correlate the records in the initial purchaser table 80 with the records in the pre-owned product table 82 while preventing the subsequent purchasers 22 from learning the identity of the initial purchasers 18 associated with each product.

More specifically, initial purchaser "3CI" is presently in possession of a 1998 SAAB 9-5 4R1 and initial purchaser B. Willis "3CI" is presently in possession of a 1997 SAAB 9-3 SE 4R2. The pre-owned products table 82 is viewable by subsequent purchasers 22 on clients 20 that are linked to server 12. This allows the subsequent purchasers 22 to determine the types of products that will be available and when each particular product will become available. Referring to FIG. 5, a sample agreement terms table 84 is illustrated and includes sample data from the agreement terms file 63 stored in storage device 59 (FIG. 2). The table 84 correlates agreement term codes, for example, "A", "B", "C", etc., which identify exemplary standard terms that initial purchasers 18 may agree to with the supplier 14. As described above when describing the initial purchaser table 80, each initial purchaser 18 has one or more agreement term codes correlated with their record (3C7).

The agreement terms table 84 includes a field for the agreement term code (5C1) and a field for the corresponding agreement terms (5C2). Each agreement term record 5R1 through 5R9, therefore, includes an agreement term code and an agreement term. The agreement term records are categorized by their type. In the embodiment illustrated, there are two agreement terms categories—"time period", and "product information". The "time period" category indicates the time period after which the supplier 14 is to contact the initial purchaser 18. The "product information" category indicates the information that the supplier 14 is to provide the initial purchaser 18 after the indicated "time period". Various other categories can be included.

An example of the use of the agreement terms table 84 follows. Referring to FIGS. 3–5, initial purchaser "C1I" has agreed to terms "A" and "J" with the supplier 14, as illustrated by field 3C7 in record 3R1 of FIG. 3. Terms "A" and "J" provide that the supplier 14 is to contact initial purchaser "C1I" "anytime" with information on a new product that is the next year of the same make and model of the pre-owned product initial purchaser "C1I" currently owns, as indicated by record 5R1 and record 5R7 of FIG. 5. Therefore, because initial purchaser "C1I" currently owns a 1998 SAAB 9-5 as indicated by record 4R1 of FIG. 4, the supplier 14 may call him when the 1999 model becomes available. At that time, initial purchaser "C1I" may be obligated by the agreement with the supplier 14 to purchase the 1999 SAAB 9-5.

Another example of the use of the agreement terms table 84 follows. With continued reference to FIGS. 3–5, initial purchaser "C2I" has agreed to terms "D" and "L" with the supplier 14, as indicated by record 3R2 of FIG. 3. Terms "D" and "L" provide that the supplier 14 is to contact initial purchaser "C21" "1½ years" after the purchase of the pre-owned product that the initial purchaser currently owns (5R2), i.e., after Nov. 12, 1998, with information on a new year product of a different make and model, as indicated by records 5R1 and 5R9. The make and model of the product can also be specified in the agreement. Therefore, because initial purchaser "C2I" currently owns a 1997 SAAB 9-3 SE as indicated in record 4R2 of table 82, the supplier 14 may call after Nov. 12, 1998 and offer him, for example, a 1998 Lexus 300. At that time, initial purchaser "C2I" may be obligated to purchase the 1998 Lexus 300. This may depend on the earlier agreement between the initial purchaser and the supplier 14.

Referring to FIG. 6, a sample new product table 86 is illustrated and includes sample data from the new product file 64 stored in storage device 59 (FIG. 2). Table 86 includes information about new products that are available for purchase. The information may be supplied by the supplier 14. The new product table 86 is viewable by initial purchasers 18 operating clients 16 that are linked to server 12 via network 24. This enables initial purchasers 18 to determine the new products that are available for purchase. Each record 6R1 through 6R5 of table 86 includes a field indicating the number of products that are available, for example, "in stock", and ready to be purchased (field 6C1). The new product table 86 further includes fields for the make (6C2), model (6C3), year (6C4), and multiple fields for the various attributes (6C5) of each product. Referring to FIG. 7, a sample subsequent purchaser table 88 is illustrated and includes sample data from subsequent purchaser file 65 stored in storage device 59 (FIG. 2). Table 88 includes information about subsequent purchasers 22 that have inquired as to the availability of particular pre-owned products.

The subsequent purchaser table 88 includes a record for each subsequent purchaser (records 7R1 through 7R4). Each record 7R1 through 7R4 further includes a field for the name of each subsequent purchaser (field 7C2), and fields for each subsequent purchaser's address (field 7C3), telephone number (field 7C4), e-mail address (field 7C5), and preferred method for being contacted (field 7C6). Each record 7R1 through 7R4 includes a subsequent purchaser identifier field (7C1) The subsequent purchaser identifier 7C 1 uniquely identifies the subsequent purchaser that inquired as to the availability of a pre-owned product. For a similar reason to that delineated above in the description of the unique initial purchaser identifiers (3C1), identifying each subsequent purchaser 22 by a unique subsequent purchaser identifier facilitates anonymity between initial purchasers 18 and subsequent purchasers 22.

Referring to FIG. 8, a sample sought-after product table 90 is illustrated and includes sample data from sought-after product file 66 stored in storage device 59 (FIG. 2). Table 90 includes information on the products that subsequent purchasers 22, which are identified in the subsequent purchaser table 88, have inquired about. The subsequent purchaser identifiers of table 90 correspond to the subsequent purchaser identifiers of table 88. In addition, the sought-after product table 90 is viewable by initial purchasers 18 operating clients 16, which are linked to server 12 via network 24. This enables initial purchasers to better understand the market for their pre-owned products.

Each record 8R1 through 8R4 includes a field for the subsequent purchaser identifier (field 8C1). Using subsequent purchaser identifiers allows the supplier 14 to correlate the records in the subsequent purchaser table 88 with the records in the sought-after product table 90 while preventing the initial purchasers 18 from learning the identity of the subsequent purchasers 22 associated with each sought-after product. The sought-after product table 90 includes a field for the make (field 8C2), model (field 8C3), year (field 8C4), and various attributes (field 8C5) of each sought-after product. From the above it is readily understood, for example, that record 8R1 indicates that subsequent purchaser "7C1" is seeking an evil blue 1998 SAAB 9-5 and that record 8R2 indicates that subsequent purchaser "C2S" is seeking a blue 1997 SAAB 9-3 SE.

It is noted that although automobiles are used in describing the tables illustrated in FIGS. 3–8, those skilled in the art will recognize that any other type of product, service, and combinations thereof, can be used to practice the invention described herein. In addition, various other agreement terms can be agreed to, for example, certain financial terms, product categories from which a purchaser must select a product, time limits within which an initial purchaser 18 must purchase a product, etc.

The following figures describe the various processes of the present invention. As described herein, the steps performed by supplier 14 may be performed by or in conjunction with server 12. Similarly, the steps performed by initial purchaser 18 may be performed by client 16 and the steps performed by subsequent purchaser 22 may be performed by client 20 as practicable.

Figure 9:
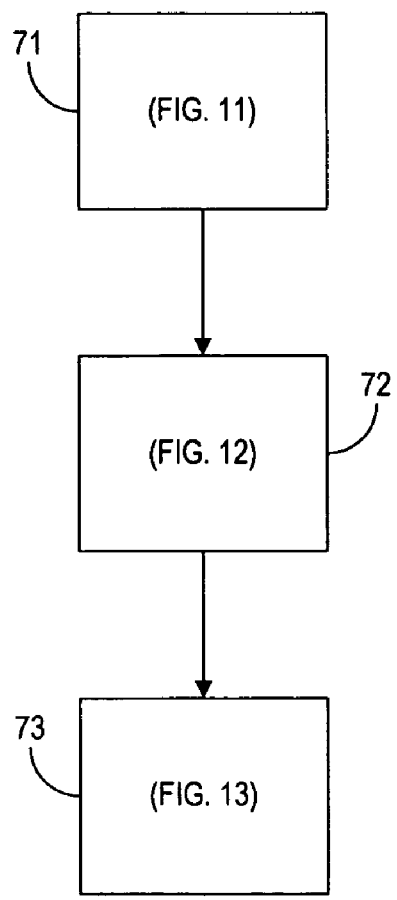
FIG. 9 is a flow chart depicting a product cycle pursuant to an embodiment of the present invention.

Referring to FIG. 9, a flow chart illustrates an embodiment of the method of the present invention. Initially, at subroutine 71, an initial purchaser 18(1) queries a supplier 14 about a particular type of new product. The supplier 14 processes the query in accordance with the desires of the initial purchaser 18. If acceptable, the initial purchaser 18 purchases the product and registers with the supplier 14. Registration information may include financing terms. For example, a supplier may offer to extend the number of payments that a purchaser might make on a subsequent item purchased the same as for the initial item purchased, but not increase the amount he must pay. Or the supplier may offer to keep the number of payments for a subsequent purchase the same as for the initial purchase, but increase the payment amount. The initial purchaser may make an offer to the supplier that the supplier may accept, reject or counter offer. The registration information is entered into the initial purchaser table 80 (FIG. 3) and pre-owned product table 82 (FIG. 4).

Thereafter, at subroutine 72, a subsequent purchaser 22(1) queries the supplier 14 about the availability of a particular type of pre-owned product or queries with an offer for a pre-owned product or the available price for a particular type of a product. The subsequent purchaser 22 may query the supplier via client 16. The supplier 14 searches the pre-owned product table 82 (FIG. 4) via server 12. If a match is made between the subsequent purchaser's query and a product in the pre-owned product table 82, the supplier 14 via server 12 generates and forwards an offer to the initial purchaser 18 of the pre-owned product that includes an offer for the initial purchaser 18 to purchase a second new product. At subroutine 73, the supplier 14 pursues a final agreement with the initial purchaser 18 to return the pre-owned product and purchase the second new product and a final agreement with the subsequent purchaser 22(1) to purchase the pre-owned product.

Figure 10:
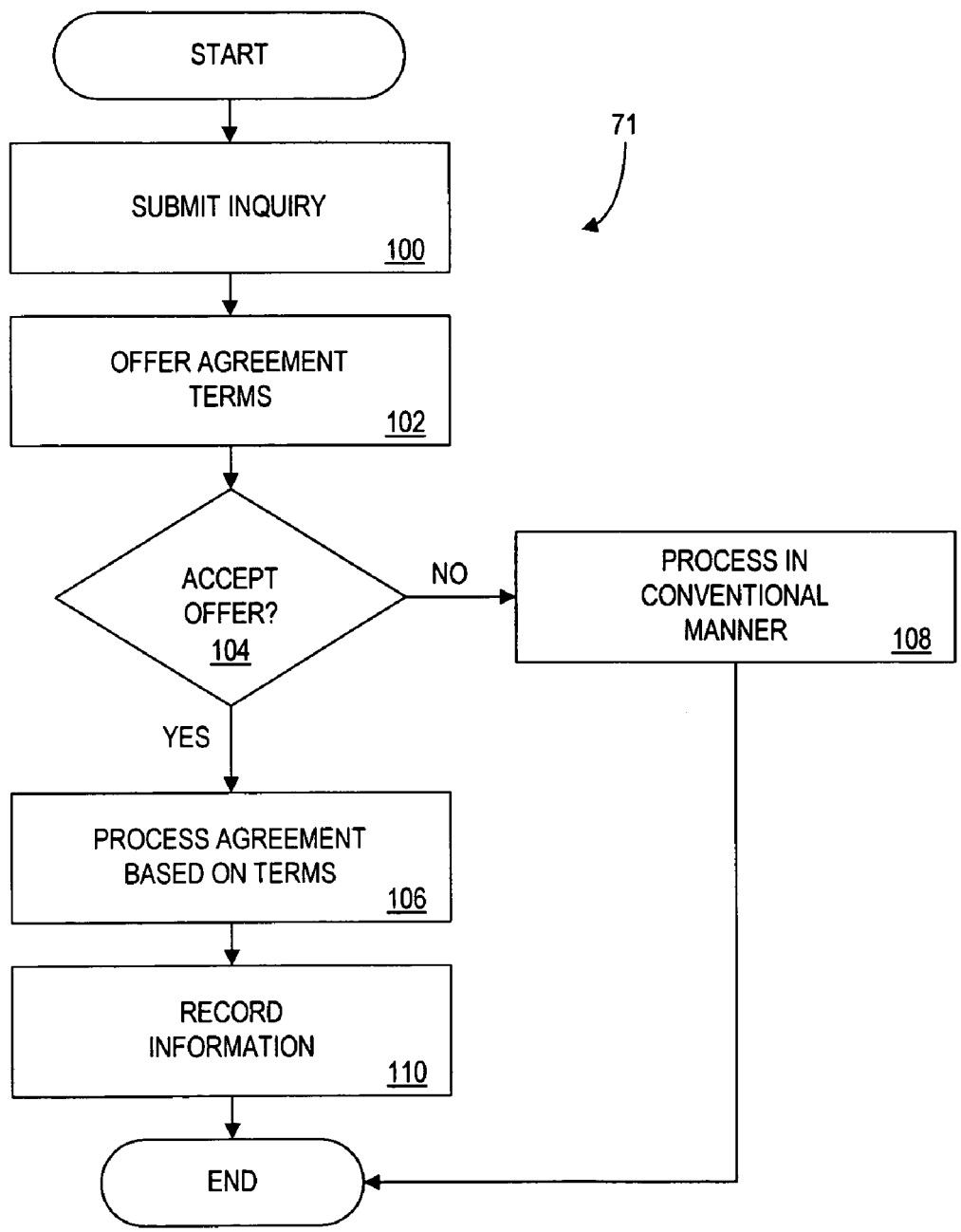
FIG. 10 is a flow chart depicting the logical flow of a subroutine enabling an initial purchaser to purchase a new product in accordance with an embodiment of the present invention.

Referring to FIG. 10, a flow chart illustrates the steps of subroutine 71 wherein an initial purchaser (18) queries the supplier 14 about a product. At step 100, the initial purchaser 18 operating client 16 electronically accesses the files of the supplier server 12 via network 24 and browses new product table 86 (FIG. 6) to view various types of new products carried by the supplier. The initial purchaser 18 then queries the supplier 14 for a particular product. The query is essentially an offer to purchase a particular product from the supplier and includes basic personal information about the initial purchaser, a description of the product the initial purchaser desires to purchase, and the price therefor.

At step 102, the supplier 14, upon receipt of the initial purchaser's query, provides the initial purchaser 18 a selection of agreement terms from the agreement terms table 84 (FIG. 5). The offer may be tailored to fit the particular initial purchaser's needs based on, for example, the personal information initially submitted by the initial purchaser, historical data accumulated through prior dealings with the particular initial purchaser or with initial purchasers sharing a similar background, etc.

At step 104, the supplier 14 receives from the initial purchaser 18 a response to the offer and determines whether the terms were accepted. If the terms were not accepted by the initial purchaser 18, then the supplier 14 processes a sale of the product to the initial purchaser 18 in a conventional manner at step 108.

If the terms were accepted by the initial purchaser 18, then, at step 106, the supplier 14 processes the sale in accordance with the terms accepted by the initial purchaser 18. At step 110, the supplier 14 records the information about the initial purchaser 18 and the agreement in the initial purchaser table 80 (FIG. 3) and records the information about the product in the pre-owned product table 82 (FIG. 4).

Figure 11:
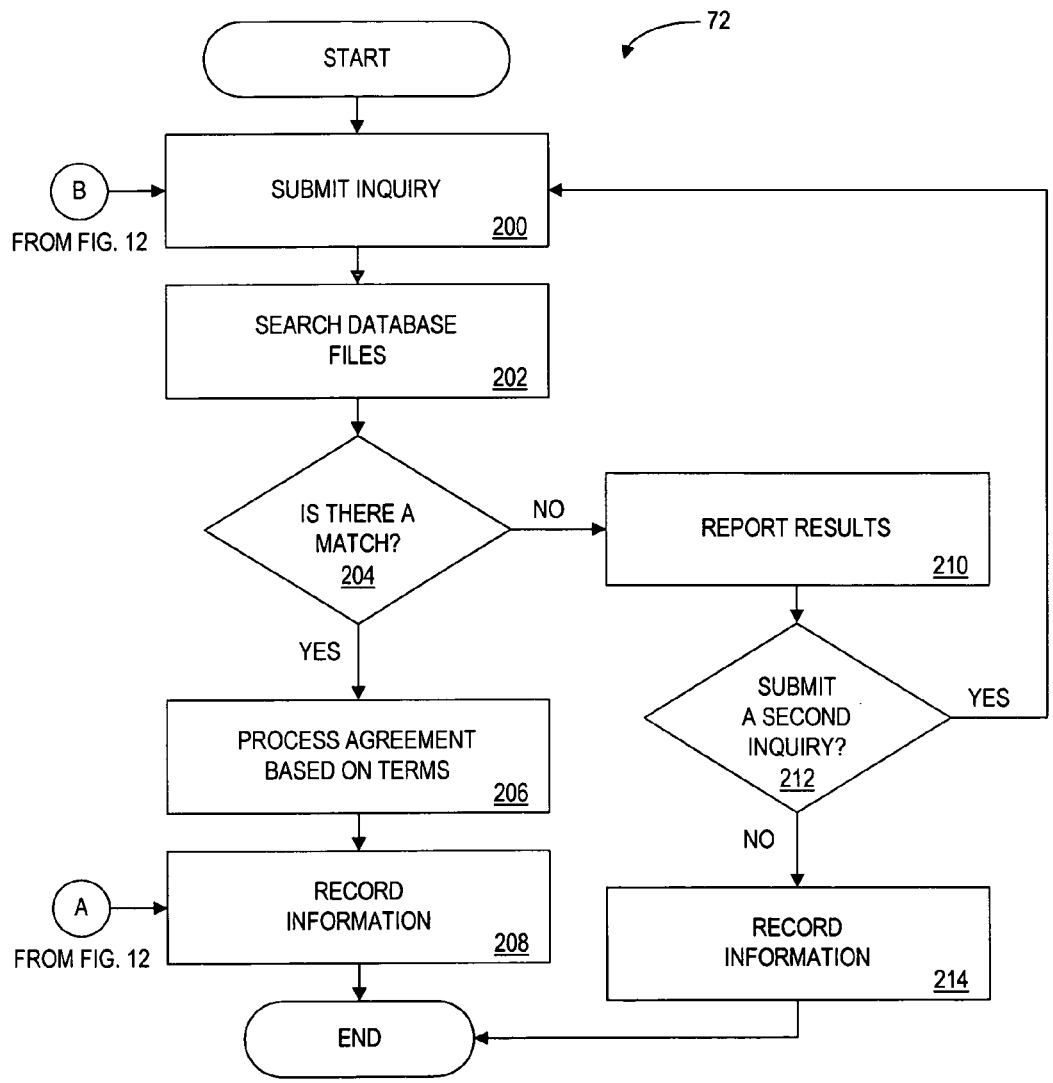
FIG. 11 is a flow chart depicting the logical flow of a subroutine enabling a subsequent purchaser to submit an inquiry for a pre-owned product and an offer to purchase a pre-owned product in accordance with an embodiment of the present invention.

Referring to FIG. 11, a flow chart illustrates the steps of subroutine 72 wherein a subsequent purchaser 22 queries a supplier 14 about the availability of a pre-owned product. At step 200, the subsequent purchaser 20 electronically accesses via network 24 the files of the supplier 14 on the server 12 and browses pre-owned product table 82 (FIG. 4). The subsequent purchaser 22 then submits a query to the supplier 14 for a pre-owned product. The query is essentially an offer to purchase a particular pre-owned product from the supplier 14 and includes basic personal information about the subsequent purchaser 22, a description of the pre-owned product that the subsequent purchaser 22 desires to purchase, and the price therefor.

At step 202, the supplier 14, upon receipt of the subsequent purchaser query, searches the database files 60 to determine if the pre-owned product is available. More specifically, the supplier 14 searches the initial purchaser table 80 (FIG. 3), the pre-owned product table 82 (FIG. 4), and the agreement terms table 84 (FIG. 5) to determine if the pre-owned product that is sought by the subsequent purchaser 22 is listed, which initial purchaser 18 is presently in possession of the pre-owned product, and the terms of the agreement between the initial purchaser 18 and the supplier 14. From the above, it is understood that the determination of whether a pre-owned product is "available" may require that a number of criteria are satisfied.

At step 204, if it is determined that there is a match, i.e., that the pre-owned product desired by the subsequent purchaser 22 is available, then, at step 206, the supplier 14 records the information about the subsequent purchaser 22 in the subsequent purchaser table 88 (FIG. 7) and records the information about the desired pre-owned product in the sought-after product table 90 (FIG. 8). At step 208, the supplier 14 generates and forwards to the initial purchaser 18 in possession of the pre-owned product an offer to purchase a second product and return the pre-owned product for a credit equaling its fair market value. The offer may also include terms wherein the initial purchaser 18 would agree to purchase a third product after a predetermined amount of time. It is foreseen that other terms can be incorporated into the offer and are considered to be a part of the present invention.

If, at step 204, it is determined that there is not a match, i.e., that the pre-owned product desired by the subsequent purchaser 22 is not available, then, at step 210, the supplier 14 reports the results of the search to the subsequent purchaser22 and queries whether the subsequent purchaser 22 desires to submit a second inquiry for a pre-owned product. At step 212, if the subsequent purchaser 22 does not desire to submit a second query, then, at step 214, the supplier 14 records the information about the subsequent purchaser 22 in the subsequent purchaser table 88 (FIG. 7) and records the information about the desired pre-owned product in the sought-after product table 90 (FIG. 8). If the subsequent purchaser 22 does desire to submit a second inquiry, then, at step 200, the subsequent purchaser 22 may access the files of the supplier 14 on the server 12 and browse pre-owned product table 82 (FIG. 4), choose a different pre-owned product, and submit a second query to the supplier for the different pre-owned product, as described above.

Figure 12:
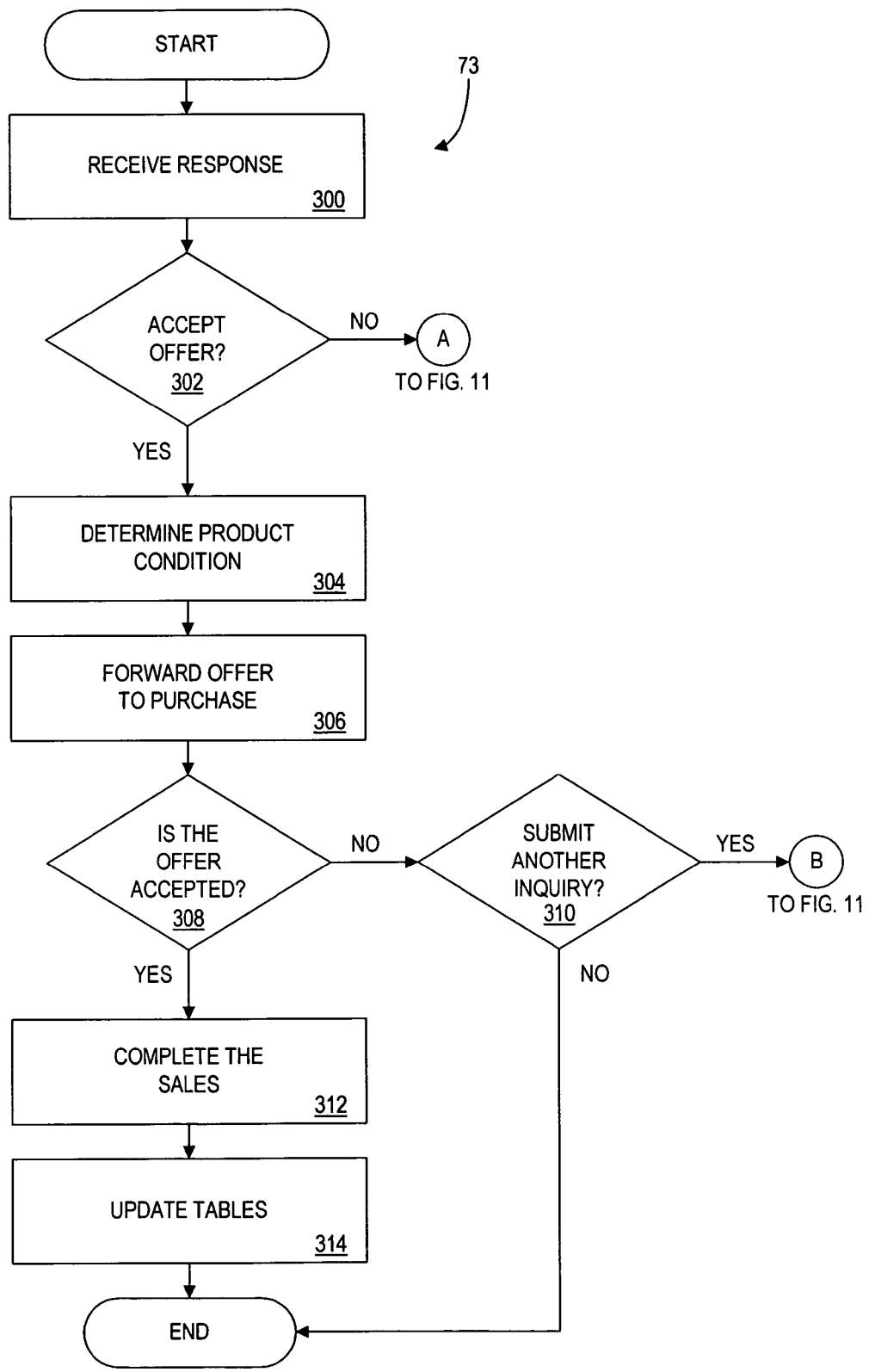
FIG. 12 is a flow chart depicting the logical flow of a subroutine for evaluating and processing the final sale of a new product to an initial purchaser and a pre-owned product to a subsequent purchaser in accordance with an embodiment of the present invention.

Referring to FIG. 12, a flow chart illustrates the steps of subroutine 73 wherein a response to the offer provided to the initial purchaser 18 is evaluated and responded to accordingly. At step 300, the supplier 14 receives the response from the initial purchaser 18 regarding the offer to purchase a second new product. The response is evaluated to determine whether or not the initial purchaser 18 accepts the offer. At step 302, if the initial purchaser 18 does not accept the offer, the supplier 14 may then, at step 208 (FIG. 11), generate and forward to the initial purchaser 18 a second offer including alternative terms that may be more appealing to the initial purchaser 18.

If, at step 302, the initial purchaser 18 does accept the offer, the supplier 14 determines, at step 304, the condition of the pre-owned product and its fair market value. In order to evaluate the fair market value of the pre-owned product, the supplier 14 may conduct the evaluation itself or have a third party determine the fair market value. For example, if the pre-owned product is an automobile or recreational vehicle, the supplier 14 may utilize the expertise of Kelley Blue Book, Inc. (Los Angeles, Calif.). As another example, if the pre-owned product is computer, musical, or audio equipment, the supplier 14 may utilize the services of Orion Research Corp. (Scottsdale, Ariz.). Alternately, the supplier 14 accepts offers from the subsequent purchaser 22, and if the offer satisfies the initial purchaser and the supplier, the offer would stand as the fair market value for the item.

At step 306, the supplier 14 generates and forwards to the subsequent purchaser 22 an offer to purchase the pre-owned product from the supplier 14. The supplier 14 includes with the offer the detailed report covering the condition of the pre-owned product. Providing this report enables the subsequent purchaser 22 to make an educated choice regarding whether to purchase the pre-owned product.

If, at step 308, the subsequent purchaser 22 does not accept the offer, the subsequent purchaser 22, at step 310, is given the opportunity to submit another query for a pre-owned product. If the subsequent purchaser 22 does desire to submit another query, then, at step 200 (FIG. 11), the subsequent purchaser 22 accesses the files of the supplier 14 on the server 12 and browses pre-owned product table 82 (FIG. 4), chooses a different pre-owned product, and submits another query to the supplier for the pre-owned product. If the subsequent purchaser 22 does not desire to submit another query, then the subroutine 73 is ended.

If, at step 308, the subsequent purchaser 22 does accept the offer, the supplier 14, at step 312, completes the sale of the product with the initial purchaser 18 and completes the sale of the pre-owned product with the subsequent purchaser 22. At step 314, the supplier 14 updates the entries regarding initial purchaser 18 in the initial purchaser table 80 (FIG. 3) and the pre-owned product table 82 (FIG. 4). In addition, the supplier 14 updates the entries regarding the subsequent purchaser 22 in the subsequent purchaser table 88 (FIG. 7) and the sought-after product table 90 (FIG. 8). The updates reflect the above-described transaction.

Although the subroutines disclosed herein are illustrated and described as having particular steps and particular sequences for the steps, it should be apparent to those of ordinary skill in the art that the subroutines may include additional/fewer steps and may be rearranged and still encompass the concepts taught by the present invention. For example, a query (FIG. 11, step 200) from a subsequent purchaser 22 may be received prior to recording relevant information about an initial purchaser 18 (FIG. 10, step 110). Also, the fair market value of a pre-owned product may be determined periodically after an agreement is made between an initial purchaser 18 and a supplier 14 instead of after an offer to purchase a second new product is accepted by an initial purchaser 18 (FIG. 12, step 304).

Figure 13:
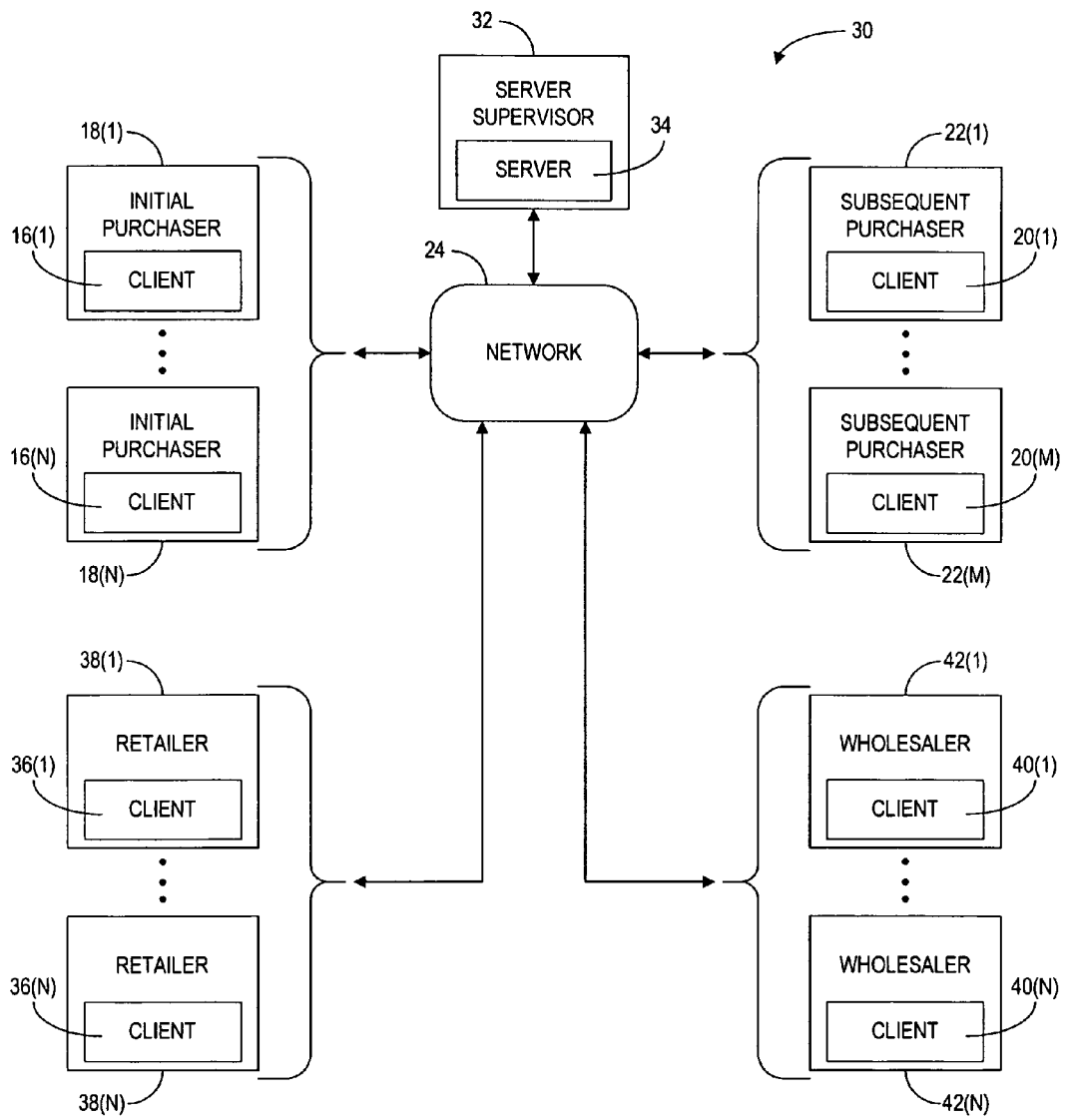
FIG. 13 is a block diagram of a network enabling a supplier to offer a multiple of products, wherein a server supervisor operates a server.

Referring to FIG. 13, another embodiment of the present invention is illustrated in block diagram form and includes a network system 30. The network system 30 includes server 34, which is operated by a server supervisor 32. The server 34 is a server substantially similar to server 12 described above and illustrated in FIGS. 1 and 2. The server supervisor 32 may be, for example, an entity that is wholly dedicated to the operation of the server 34 of a World Wide Web site, or a creditor entity capable of providing loans to finance transactions conducted thereon, such as the server of a credit card issuing bank.

Linked to the server 34 through network 24 are one or more clients 16 operated by the initial purchasers 18 and one or more clients 20 operated by the subsequent purchasers 22 as described above in FIG. 1. Also linked to the server 34 through network 24 are one or more clients 36 operated by retailers 38 and one or more clients 40 operated by wholesalers 42. Clients 36 and 40 may link to the server 34 in any conventional manner.

In another embodiment of the present invention, the server supervisor 32 may be an online web site that facilitates the sale of items, and is configured to sell products to initial purchasers, and receive requests for previously purchased items from subsequent purchasers 22. The server supervisor 32 receives offers from potential subsequent purchasers for items previously sold to initial purchasers18. The server supervisor 32 contacts initial purchasers 18 with offers to use the above described purchase program to purchase a subsequent item. The initial purchaser must ship, deliver, or give over to a retailer 38 or a subsequent purchaser 22 the initially purchased item. He then receives a new item, either receiving a shipped item, or purchasing and picking up the item from a retailer 38 according the terms of the purchase program. This retailer may be the same entity that the initial purchaser 18 delivers or ships the initial purchase to, if he ships or delivers the initially purchased item to a retailer 38. The subsequent purchaser 22 either receives or picks up the initially purchased item from an initial purchaser or the retailer an initial purchaser delivered or shipped the item to, and may register the item with the web site so that he may also receive offers to resell as apart of the purchase program.

Including wholesalers 42 in the network system 30 provides substantial advantages to both the retailers 38 and the wholesalers 42. For example, wholesalers 42 may provide retailers 38 updated information regarding price changes, new product models, and enhancements to existing or new models of products. Such Information may be stored in the new product field 64. Wholesalers 42 may provide descriptions of features for new products, and upgrades for older ones to the retailer 38. A computer software manufacturer, for example, might contact a retailer to provide him with information about features in the upcoming product line. The retailer 38 would use this information to entice initial purchasers 18 of compatible products to participate in the above described purchase program by notifying them of new products the manufacturer will be offering in the future. Retailers may in turn provide wholesalers with invaluable marketing information such as purchasing trends, and gathered demand for the upcoming products.

Alternately, wholesalers 42 may interact directly with initial purchasers 18, for example, by directly supplying them new products using the above described system and method. In addition, a manufacturer can act as a wholesaler and interact with the retailers 38 or interact directly with the initial purchasers 18.

In another embodiment of the present invention server supervisor 32 may be a credit card issuing bank, or a financing bank for suppliers of certain items. For example the server 32 may be the financing bank for a computer retailer 38, which tracks initial purchasers 18 of computer hardware. When a subsequent purchaser 22 requests an item that the financing bank 32 has sold to an initial purchaser, the financing bank 32 contacts the initial purchaser 18 and offers another item to the initial purchaser according to the terms described in the above invention.

It is clear from the foregoing disclosure that the present system and method for offering multiple products provides an advancement in the art of product acquisition and distribution. The system and method allows consumers of new products to possess products that incorporate the latest technology or the latest fashion or to possess products that fulfill their immediate needs. In addition, the system and method enables consumers of new products to readily dispose of products that they do not want because of a change in their circumstances. Also, the system and method allows consumers of pre-owned products to have access to a wide selection of high quality pre-owned products. Furthermore, the system and method allows suppliers of new and pre-owned products and services to maximize the unique position that they hold in the marketplace.

While the invention has been described with respect to various specific embodiments, those skilled in the art will readily appreciated that various modifications, changes, and enhancements may be made thereto without departing from the spirit or scope of the invention as defined by the appended claims.

What is claimed is:

1. A method for a supplier to offer a second product to a first person, comprising:
   storing data relating to a first product that has been provided to the first person and data identifying the first person in a memory of a computer;
   receiving an inquiry relating to the first product from a second person;
   searching, based on the inquiry, the memory to determine whether the data relating to the first product is stored therein; and
   transmitting, from the supplier and to the first person based on the data identifying the first person, an offer to exchange the first product for a second product.

2. A method as recited in claim 1, further comprising the step of the supplier making an agreement with the first person, the agreement relating to the providing of the first product to the first person, wherein the agreement is selected from at least one of a lease agreement, a finance purchase agreement, and an outright purchase agreement.

3. A method as recited in claim 1, further comprising the step of making an agreement with the first person, wherein the agreement provides that the supplier will offer the first person the second product.

4. A method as recited in claim 3, wherein the agreement further provides a time period within which the supplier will transmit the offer to the first person.

5. A method as recited in claim 3, wherein the agreement further provides a description of the second product that the supplier will offer to the first person.

6. A method as recited in claim 3, wherein the agreement further provides that the first person will obtain the second product for an amount equal to a cost of the second product minus a fair market value of the first product.

7. A method as recited in claim 6, wherein the agreement further provides that the fair market value of the first product will be determined by a third party.

8. A method as recited in claim 7, wherein the third party is the supplier.

9. A method as recited in claim 1, wherein the data that relates to the first product is selected from at least one of a manufacturer, physical characteristics, model, and product identifier of the first product.

10. A method as recited in claim 1, wherein the data that identifies the first person is selected from at least one of a name, address, telephone number, e-mail address, and identification number of the first person.

11. A method as recited in claim 1, wherein the first and second products are selected from at least one of goods and services.

12. A method as recited in claim 1, wherein the second person has access to the data that relates to the first product.

13. A method as recited in claim 1, further comprising the step of storing data relating to an inventory of products from which the first person may select the second product.

14. A method as recited in claim 13, wherein the data relating to the inventory of products comprises data identifying a variety of new products.

15. A method as recited in claim 1, wherein the step of searching comprises the step of evaluating the availability of the first product.

16. A method as recited in claim 15, wherein the availability of the first product is affected by at least one of (i) an agreement between the supplier and the first person that describes a time period within which the first person may be contacted in order to receive the offer, (ii) the availability of the second product, and (iii) the cost of the second product.

17. A method as recited in claim 1, wherein the offer to the first person further provides that the first person can obtain the second product for an amount equal to a cost of the second product minus a fair market value of the first product.

18. A method as recited in claim 17, wherein the offer to the first person further provides that the fair market value of the first product is to be determined by a third party.

19. A method as recited in claim 18, wherein the third party is the supplier.

20. A method as recited in claim 1, wherein the offer includes an amount the first person is to pay for the second product, and wherein the amount is equal to the difference between a cost associated with the second product and a cost associated with the first product.

21. A method as recited in claim 20, wherein the amount the first person is to pay for the second product is affected by a product variable selected from at least one of the condition of the first product, the availability of the second product, and the price of the second product.

22. A method as recited in claim 1, wherein the offer to the first person further provides a selection of products from which the first person can choose the second product.

23. A method as recited in claim 1, wherein the first product includes more than one product.

24. A system for a supplier to offer a second product to a first person, comprising:
  a memory for storing data relating to a first product that has been provided to the first person and data identifying the first person; and
  a processor in communication with the memory, wherein the processor is programmed to store the data relating to the first product and the data identifying the first person in the memory;
    receive an inquiry relating to the first product from a second person;
    search, based on the inquiry, the memory to determine whether the data relating to the first product is stored therein; and
    transmit, from the supplier and to the first person based on the data identifying the first person, an offer to exchange the first product for a second product.

25. A system as recited in claim 24, wherein the processor is further programmed to receive data relating to an agreement between the supplier and the first purchaser, the agreement relating to the providing of the first product to the first person, wherein the agreement is selected from at least one of a lease agreement, a finance purchase agreement, and an outright purchase agreement.

26. A system as recited in claim 24, wherein the processor is further programmed to receive data relating to an agreement between the supplier and the first purchaser, wherein the agreement provides that the supplier is to offer the first person the second product.

27. A system as recited in claim 26, wherein the agreement further provides a time period within which the supplier will transmit the offer to the first person.

28. A system as recited in claim 26, wherein the agreement further provides a description of the second product that the supplier will offer to the first person.

29. A system as recited in claim 26, wherein the agreement further provides that the first person will obtain the second product for an amount equal to a cost of the second product minus a fair market value of the first product.

30. A system as recited in claim 29, wherein the agreement further provides that the fair market value of the first product is to be determined by a third party.

31. A system as recited in claim 30, wherein the third party is the supplier.

32. A system as recited in claim 24, wherein the data that relates to the first product is selected from at least one of a manufacturer, physical characteristics, model, and product identifier of the first product.

33. A system as recited in claim 24, wherein the data that identifies the first person is selected from at least one of a name, address, telephone number, e-mail address, and product identifier of the first person.

34. A system as recited in claim 24, wherein the first and second products are selected from at least one of goods and services.

35. A system as recited in claim 24, wherein the second person has access to the data that relates to the first product.

36. A system as recited in claim 24, wherein the processor is further programmed to store data relating to an inventory of products from which the first person may select the second product.

37. A system as recited in claim 36, wherein the data relating to the inventory of products comprises data identifying a variety of new products.

38. A system as recited in claim 24, wherein the processor is further programmed to evaluate the availability of the first product.

39. A system as recited in claim 38, wherein the availability of the first product is affected by at least one of (i) an agreement between the supplier and the first person that describes a time period within which the first person may be contacted in order to receive the offer, (ii) the availability of the second product, and (iii) the cost of the second product.

40. A system as recited in claim 24, wherein the offer to the first person further provides that the first person can obtain the second product for an amount equal to a cost of the second product minus a fair market value of the first product.

41. A system as recited in claim 40, wherein the offer to the first person further provides that the fair market value of the first product is to be determined by a third party.

42. A system as recited in claim 41, wherein the third party is the supplier.

43. A system as recited in claim 24, wherein the offer includes an amount the first person is to pay for the second product, and wherein the amount is equal to the difference between a cost associated with the second product and a cost associated with the first product.

44. A system as recited in claim 24, wherein the offer to the first person further provides a selection of products from which the first person can choose the second product.

45. A system as recited in claim 24, wherein the first product is more than one product.

46. A method for a first person to acquire a second product from a supplier, comprising:
obtaining a first product;
transmitting, via a network, data to the supplier including a description of the first product and a description of the first person; and
receiving an offer to exchange the first product for a second product from the supplier, wherein the offer is a result of an inquiry by a second person to the supplier for the first product.

47. A method as recited in claim 46, wherein the step of obtaining the first product comprises the step of receiving the first product from the supplier and making a related agreement with the supplier, wherein the agreement is selected from at least one of a lease agreement, a finance purchase agreement, and an outright purchase agreement.

48. A method as recited in claim 46, wherein the step of obtaining the first product comprises the step of receiving the first product from the supplier and making a related agreement with the supplier, the agreement providing that the supplier will offer the first person the second product.

49. A method as recited in claim 48, wherein the agreement further provides a time period within which the supplier will transmit the offer to the first person.

50. A method as recited in claim 48, wherein the agreement further provides a description of the second product that the supplier will offer to the first person.

51. A method as recited in claim 48, wherein the agreement further provides that the first person will obtain the second product for an amount equal to a cost of the second product minus a fair market value of the first product.

52. A method as recited in claim 51, wherein the agreement further provides that the fair market value of the first product will be determined by a third party.

53. A method as recited in claim 52, wherein the third party is the supplier.

54. A method as recited in claim 46, wherein the description of the first product is selected from at least one of a manufacturer, physical characteristics, model, and product identifier of the first product.

55. A method as recited in claim 46, wherein the description of the first person is selected from at least one of the name, address, telephone number, e-mail address, and product identifier of the first person.

56. A method as recited in claim 46, wherein the first and second products are selected from at least one of goods and services.

57. A method as recited in claim 46, further comprising the step of searching data relating to an inventory of products from which the first person may select the second product.

58. A method as recited in claim 57, wherein the data relating to the inventory of products comprises data identifying a variety of new products.

59. A method as recited in claim 46, wherein the offer for the second product from the supplier further provides that the first person will obtain the second product for an amount equal to a cost of the second product minus a fair market value of the first product.

60. A method as recited in claim 59, wherein the offer for the second product from the supplier further provides that the fair market value of the first product will be determined by a third party.

61. A method as recited in claim 60, wherein the third party is the supplier.

62. A method as recited in claim 46, wherein the offer for the second product from the supplier further provides a selection of products from which the first person can choose the second product.

63. A method as recited in claim 46, wherein the offer includes an amount the first person is to pay for the second product, and wherein the amount is equal to the difference between a cost associated with the second product and a cost associated with the first product.

64. A method as recited in claim 63, wherein the amount the first person is to pay for the second product is affected by a product variable selected from at least one of the condition of the first product, the availability of the second product, and the price of the second product.

65. A method as recited in claim 46, further comprising the step of accepting the offer from the supplier and selecting a preference for the second product.

66. A method as recited in claim 46, wherein the first product is more than one product.

67. A method for a supplier to offer a second product to a first person, comprising:
receiving a request from the first person for a first product;
providing the first person the first product;
storing data relating to the first product and data identifying the first person in a memory of a computer;
receiving an inquiry relating to the first product from a second person;
searching, based on the inquiry, the memory to determine whether the data relating to the first product is stored therein; and
transmitting, from the supplier and to the first person based on the data identifying the first person, an offer to exchange the first product for a second product.

68. A method as recited in claim 67, further comprising the step of the supplier making an agreement with the first person, the agreement relating to the providing of the first product to the first person, wherein the agreement is selected from at least one of a lease agreement, a finance purchase agreement, and an outright purchase agreement.

69. A method as recited in claim 67, further comprising the step of making an agreement with the first person, wherein the agreement provides that the supplier will offer the first person the second product.

70. A method as recited in claim 69, wherein the agreement further provides a time period within which the supplier will transmit the offer to the first person.

71. A method as recited in claim 69, wherein the agreement further provides a description of the second product that the supplier will offer to the first person.

72. A method as recited in claim 69, wherein the agreement further provides that the first person will obtain the second product for an amount equal to a cost of the second product minus a fair market value of the first product.

73. A method as recited in claim 72, wherein the agreement further provides that the fair market value of the first product will be determined by a third party.

74. A method as recited in claim 73, wherein the third party is the supplier.

75. A method as recited in claim 67, wherein the data that relates to the first product is selected from at least one of a manufacturer, physical characteristics, model, and product identifier of the first product.

76. A method as recited in claim 67, wherein the data that identifies the first person is selected from at least one of a name, address, telephone number, e-mail address, and product identifier of the first person.

77. A method as recited in claim 67, wherein the first and second products are selected from at least one of goods and services.

78. A method as recited in claim 67, wherein the second person has access to the data that relates to the first product.

79. A method as recited in claim 67, further comprising the step of storing data relating to an inventory of products from which the first person may select the first product.

80. A method as recited in claim 79, wherein the data relating to the inventory of products comprises data identifying a variety of new products.

81. A method as recited in claim 67, further comprising the step of storing data relating to an inventory of products from which the first person may select the second product.

82. A method as recited in claim 81, wherein the data relating to the inventory of products comprises data identifying a variety of new products.

83. A method as recited in claim 67, wherein the step of searching comprises the step of evaluating the availability of the first product.

84. A method as recited in claim 83, wherein the availability of the first product is affected by at least one of (i) an agreement between the supplier and the first person that describes a time period within which the first person may be contacted in order to receive the offer, (ii) the availability of the second product, and (iii) the cost of the second product.

85. A method as recited in claim 67, wherein the offer to the first person further provides that the first person can obtain the second product for an amount equal to a cost of the second product minus a fair market value of the first product.

86. A method as recited in claim 85, wherein the offer to the first person further provides that the fair market value of the first product is to be determined by a third party.

87. A method as recited in claim 86, wherein the third party is the supplier.

88. A method as recited in claim 67, wherein the offer includes an amount the first person is to pay for the second product, and wherein the amount is equal to the difference between a cost associated with the second product and a cost associated with the first product.

89. A method as recited in claim 88, wherein the amount the first person is to pay for the second product is affected by a product variable selected from at least one of the condition of the first product, the availability of the second product, and the price of the second product.

90. A method as recited in claim 67, wherein the offer to the first person further provides a selection of products from which the first person can choose the second product.

91. A method as recited in claim 67, wherein the first product is more than one product.

92. A method for a supplier to offer a second product to a first person, comprising:
storing data relating to a first product that has been provided to the first person and data identifying the first person in a memory of a computer;
transmitting, from the supplier and to the first person based on the data identifying the first person, an offer to exchange the first product for a second product;
searching the memory to determine whether there is data identifying a second person and data indicating that the second person may be interested in obtaining the first product; and
transmitting, from the supplier and to the second person based on the data identifying the second person, an offer for the first product.

93. A method as recited in claim 92, further comprising the step of the supplier making an agreement with the first person, the agreement relating to the providing of the first product to the first person, wherein the agreement is selected from at least one of a lease agreement, a finance purchase agreement, and an outright purchase agreement.

94. A method as recited in claim 92, further comprising the step of making an agreement with the first person, wherein the agreement provides that the supplier will offer the first person the second product.

95. A method as recited in claim 94, wherein the agreement further provides a time period within which the supplier will transmit the offer to the first person.

96. A method as recited in claim 94, wherein the agreement further provides a description of the second product that the supplier will offer to the first person.

97. A method as recited in claim 94, wherein the agreement further provides that the first person will obtain the second product for an amount equal to a cost of the second product minus a fair market value of the first product.

98. A method as recited in claim 97, wherein the agreement further provides that the fair market value of the first product will be determined by a third party.

99. A method as recited in claim 98, wherein the third party is the supplier.

100. A method as recited in claim 92, wherein the data that relates to the first product is selected from at least one of a manufacturer, physical characteristics, model, and product identifier of the first product.

101. A method as recited in claim 92, wherein the data that identifies the first person is selected from at least one of a name, address, telephone number, e-mail address, and product identifier of the first person.

102. A method as recited in claim 92, wherein the first and second products are selected from at least one of goods and services.

103. A method as recited in claim 92, wherein the second person has access to the data that relates to the first product.

104. A method as recited in claim 92, further comprising the step of storing data relating to an inventory of products from which the first person may select the second product.

105. A method as recited in claim 104, wherein the data relating to the inventory of products comprises data identifying a variety of new products.

106. A method as recited in claim 92, wherein the offer to the first person further provides that the first person can obtain the second product for an amount equal to a cost of the second product minus a fair market value of the first product.

107. A method as recited in claim 106, wherein the offer to the first person further provides that the fair market value of the first product is to be determined by a third party.

108. A method as recited in claim 107, wherein the third party is the supplier.

109. A method as recited in claim 92, wherein the offer includes an amount the first person is to pay for the second product, and wherein the amount is equal to the difference between a cost associated with the second product and a cost associated with the first product.

110. A method as recited in claim 109, wherein the amount the first person is to pay for the second product is affected by a product variable selected from at least one of the condition of the first product, the availability of the second product, and the price of the second product.

111. A method as recited in claim 92, wherein the offer to the first person further provides a selection of products from which the first person can choose the second product.

112. A method as recited in claim 92, wherein the first product includes more than one product.

* * * * *